United States Patent
Goel

(10) Patent No.: US 11,888,946 B2
(45) Date of Patent: Jan. 30, 2024

(54) METHODS, SYSTEMS, AND COMPUTER READABLE MEDIA FOR APPLYING OR OVERRIDING PREFERRED LOCALITY CRITERIA IN PROCESSING NETWORK FUNCTION (NF) DISCOVERY REQUESTS

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 48 days.

(21) Appl. No.: 17/337,356

(22) Filed: Jun. 2, 2021

(65) Prior Publication Data

US 2022/0394597 A1    Dec. 8, 2022

(51) Int. Cl.
*H04L 67/52* (2022.01)
*H04L 67/51* (2022.01)
*H04W 48/14* (2009.01)

(52) U.S. Cl.
CPC .............. *H04L 67/52* (2022.05); *H04L 67/51* (2022.05); *H04W 48/14* (2013.01)

(58) Field of Classification Search
CPC ....... H04L 67/52; H04L 67/51; H04L 67/568; H04L 67/562; H04W 48/14; H04W 4/50
See application file for complete search history.

(56) References Cited

U.S. PATENT DOCUMENTS 6,014,558 A   1/2000  Thomas
8,069,101 B1  11/2011 von Groll et al.
(Continued)

FOREIGN PATENT DOCUMENTS

CN   114039874 A    2/2022
EP   3 716 692 A1   9/2020
(Continued)

OTHER PUBLICATIONS

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

(Continued)

*Primary Examiner* — Kevin T Bates
*Assistant Examiner* — Ranjan Pant
(74) *Attorney, Agent, or Firm* — Jenkins, Taylor & Hunt, P.A.

(57) ABSTRACT

A method for applying or overriding preferred locality criteria in processing NF discovery requests includes, at an NRF including at least one processor, maintaining an NF profiles database including NF profiles of producer NFs registered to provide service to other NFs, receiving, from an NF, an NFDiscover request including a preferred-locality attribute or lacking a preferred-locality attribute, accessing the NF profiles database to identify NF profiles of producer NFs capable of providing a service indicated by query parameters in the NFDiscover request, generating an NFDiscover response including the NF profiles identified as capable of providing the service indicated by the query parameters in the NFDiscover request, prioritizing the NF profiles in the NFDiscover response in a manner that overrides the preferred-locality attribute in the NFDiscover request or applies a preferred locality attribute selected by the NRF, and transmitting the NFDiscover response to the NF that transmitted the NFDiscover request.

12 Claims, 8 Drawing Sheets

(56) References Cited

U.S. PATENT DOCUMENTS

| | | |
|---|---|---|
| 8,069,181 B1 | 11/2011 | Krishan et al. |
| 9,124,537 B2 | 9/2015 | Kolze |
| 9,246,762 B1 | 1/2016 | Watkins |
| 10,313,362 B2 | 6/2019 | Ahuja et al. |
| 10,609,530 B1 | 3/2020 | Patil et al. |
| 10,637,753 B1 | 4/2020 | Taft et al. |
| 10,686,667 B1 | 6/2020 | Subramaniam |
| 10,772,062 B1 | 9/2020 | Albasheir et al. |
| 11,109,307 B2 | 8/2021 | Bartolome Rodrigo et al. |
| 11,271,846 B2 | 3/2022 | Krishan |
| 11,470,544 B2 | 10/2022 | Singh et al. |
| 11,483,694 B2 | 10/2022 | Krishan |
| 11,496,954 B2 | 11/2022 | Gupta et al. |
| 11,528,334 B2 | 12/2022 | Krishan |
| 11,570,262 B2 | 1/2023 | Sapra et al. |
| 11,589,298 B2 | 2/2023 | Sapra et al. |
| 11,652,895 B1 | 5/2023 | Sapra et al. |
| 2005/0181776 A1 | 8/2005 | Verma et al. |
| 2005/0193096 A1 | 9/2005 | Yu et al. |
| 2006/0010224 A1 | 1/2006 | Sekar et al. |
| 2007/0050331 A1 | 3/2007 | Bauman et al. |
| 2008/0101293 A1 | 5/2008 | Woo et al. |
| 2009/0222584 A1 | 9/2009 | Josefsberg et al. |
| 2013/0086245 A1 | 4/2013 | Lu et al. |
| 2013/0198269 A1 | 8/2013 | Fleischman et al. |
| 2013/0272123 A1 | 10/2013 | Lee et al. |
| 2014/0040975 A1 | 2/2014 | Raleigh et al. |
| 2016/0156513 A1 | 6/2016 | Zhang et al. |
| 2016/0350683 A1 | 12/2016 | Bester et al. |
| 2016/0380906 A1 | 12/2016 | Hodique et al. |
| 2017/0077751 A1 | 3/2017 | Forbes |
| 2017/0221015 A1 | 8/2017 | June et al. |
| 2018/0205637 A1 | 7/2018 | Li |
| 2018/0262625 A1 | 9/2018 | McCarley et al. |
| 2018/0285794 A1 | 10/2018 | Gray-Donald et al. |
| 2018/0324247 A1 | 11/2018 | Hood et al. |
| 2019/0007366 A1 | 1/2019 | Voegele et al. |
| 2019/0140895 A1 | 5/2019 | Ennis, Jr. et al. |
| 2019/0158364 A1 | 5/2019 | Zhang et al. |
| 2019/0166001 A1 | 5/2019 | Ma et al. |
| 2019/0222633 A1 | 7/2019 | Howes et al. |
| 2019/0230556 A1 | 7/2019 | Lee |
| 2019/0342229 A1 | 11/2019 | Khinvasara et al. |
| 2019/0394284 A1 | 12/2019 | Baghel et al. |
| 2020/0036754 A1 | 1/2020 | Livanos |
| 2020/0059420 A1 | 2/2020 | Abraham |
| 2020/0106812 A1 | 4/2020 | Verma et al. |
| 2020/0127916 A1 | 4/2020 | Krishan |
| 2020/0136911 A1 | 4/2020 | Assali et al. |
| 2020/0137174 A1 | 4/2020 | Stammers et al. |
| 2020/0305033 A1 | 9/2020 | Keller et al. |
| 2020/0314615 A1 | 10/2020 | Patil et al. |
| 2020/0336554 A1 | 10/2020 | Deshpande et al. |
| 2020/0367148 A1 | 11/2020 | Baek et al. |
| 2021/0007023 A1 | 1/2021 | Umapathy et al. |
| 2021/0044481 A1 | 2/2021 | Xu et al. |
| 2021/0076248 A1 | 3/2021 | Kallam et al. |
| 2021/0099856 A1 | 4/2021 | Cakulev et al. |
| 2021/0136602 A1 | 5/2021 | Pokkunuri et al. |
| 2021/0168055 A1 | 6/2021 | Lair |
| 2021/0204200 A1 | 7/2021 | Krishan et al. |
| 2021/0235254 A1 | 7/2021 | Farooq |
| 2021/0273977 A1 | 9/2021 | Karasaridis et al. |
| 2021/0274392 A1 | 9/2021 | Dao et al. |
| 2021/0297935 A1 | 9/2021 | Belling et al. |
| 2021/0367916 A1 | 11/2021 | Belling et al. |
| 2021/0368427 A1* | 11/2021 | Rommer .............. H04W 48/16 |
| 2021/0385286 A1 | 12/2021 | Wang et al. |
| 2021/0385732 A1* | 12/2021 | Reyes ................ H04L 67/52 |
| 2022/0038545 A1 | 2/2022 | Krishan |
| 2022/0070648 A1 | 3/2022 | Krishan |
| 2022/0103644 A1 | 3/2022 | Park et al. |
| 2022/0110082 A1 | 4/2022 | Belling et al. |
| 2022/0131945 A1 | 4/2022 | Sapra et al. |
| 2022/0159464 A1 | 5/2022 | Rajput et al. |
| 2022/0191294 A1* | 6/2022 | Yang ....................... H04L 67/30 |
| 2022/0264432 A1 | 8/2022 | Reyes et al. |
| 2022/0286949 A1 | 9/2022 | Sapra et al. |
| 2022/0295384 A1 | 9/2022 | Gupta et al. |
| 2022/0330085 A1 | 10/2022 | Li |
| 2022/0346188 A1 | 10/2022 | Malhotra |
| 2022/0394453 A1 | 12/2022 | Goel |
| 2022/0417783 A1 | 12/2022 | Srivastava et al. |
| 2023/0052267 A1 | 2/2023 | Goel et al. |
| 2023/0096969 A1 | 3/2023 | Sapra et al. |
| 2023/0099676 A1 | 3/2023 | Jayaramachar et al. |
| 2023/0179681 A1 | 6/2023 | Krishan |

FOREIGN PATENT DOCUMENTS

| | | | | |
|---|---|---|---|---|
| KR | 20190088060 A | 7/2019 | | |
| KR | 20220006908 A | 1/2022 | | |
| WO | WO-2019076276 A1 * | 4/2019 | ............ | H04L 29/06 |
| WO | WO 2019/144321 A1 | 8/2019 | | |
| WO | WO 2019/215308 A1 | 11/2019 | | |
| WO | WO-2020001842 A1 * | 1/2020 | ............ | H04L 43/10 |
| WO | WO 2020/030291 A1 | 2/2020 | | |
| WO | WO-2020030291 A1 * | 2/2020 | ......... | H04L 41/0813 |
| WO | WO 2020/083516 A1 | 4/2020 | | |
| WO | WO-2020083516 A1 * | 4/2020 | ............ | H04L 67/16 |
| WO | WO-2020192254 | * | 10/2020 | |
| WO | WO 2021/011933 A1 | 1/2021 | | |
| WO | WO 2021/092441 A1 | 5/2021 | | |
| WO | WO 2021/110287 A1 | 6/2021 | | |
| WO | WO-2021110287 A1 * | 6/2021 | | |
| WO | WO 2021219385 A1 | 11/2021 | | |
| WO | WO 2022/025987 A1 | 2/2022 | | |
| WO | WO 2022/050987 A1 | 3/2022 | | |
| WO | WO 2022/093319 A1 | 5/2022 | | |
| WO | WO 2022152870 A1 | 7/2022 | | |
| WO | WO 2022/179713 A1 | 9/2022 | | |
| WO | WO 2022/197531 A1 | 9/2022 | | |

OTHER PUBLICATIONS

"3rd Generation Partnership Project; Technical Specification Group Core Network and Terminals; 5G System; Network Function Repository Services; Stage 3 (Release 17)," 3GPP TS 23.510, V17.1.0, pp. 1-243 (Mar. 2021).

Commonly-Assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations," (Unpublished, filed Aug. 9, 2021).

Notification of Transmittal of the International Search Report and the Written Opinion of the International Searching Authority, or the Declaration for International Application No. PCT/US2021/024000 (dated Jun. 24, 2021).

Non-Final Office Action for U.S. Appl. No. 16/356,446 (dated Jun. 16, 2021).

Notification of Transmittal of the International Search Report and the Written Opinion of the International Searching Authority, or the Declaration for U.S. Patent Application Serial No. PCT/US2021/020120 (Jun. 1, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

Commonly-Assigned, co-pending U.S. Appl. No. 17/200,777 for "Methods, Systems, and Computer Readable Media for Supporting Multiple Preferred Localities for Network Function (NF) Discovery and Selection Procedures" (Unpublished, filed Mar. 13, 2021).

Advisory Action for U.S. Appl. No. 16/356,446 (dated Dec. 22, 2020).

Commonly-Assigned, co-pending U.S. Appl. No. 17/082,871 for "Methods, Systems, and Computer Readable Media for Rank Processing for Network Function Selection," (Unpublished, filed Oct. 28, 2020).

Final Office Action for U.S. Appl. No. 16/356,446 (dated Sep. 8, 2020).

(56) References Cited

OTHER PUBLICATIONS

Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Commonly-Assigned, co-pending U.S. Appl. No. 16/945,794 for "Methods, Systems, And Computer Readable Media For Preferred Network Function (NF) Location Routing Using Service Communications Proxy (SCP)," (Unpublished, filed Jul. 31, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Non-Final Office Action for U.S. Appl. No. 16/356,446 (dated May 11, 2020).
Nokia et al., "Discussion paper on authorization for Model D Indirect communications", 3GPP TSG SA WG3; S3-194380 (Nov. 11, 2019).
Commonly-Assigned, co-pending U.S. Appl. No. 16/356,446 for "Methods, Systems, And Computer Readable Media For Locality-Based Selection And Routing Of Traffic To Producer Network Functions (NFs)," (Unpublished, filed Mar. 18, 2019).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).
Notice of Allowance and Fee(s) Due for U.S. Appl. No. 17/082,871 (dated Sep. 28, 2022).
Notification of Transmittal of the International Search Report and the Written Opinion of the International Searching Authority, or the Declaration for International Application No. PCT/US2022/031566 (dated Sep. 2, 2022).
Examiner-Initiated Interview Summary for U.S. Appl. No. 17/672,639 (dated Aug. 10, 2022).
Notice of Allowance and Fee(s) Due for U.S. Appl. No. 16/945,794 (dated Aug. 2, 2022).
Non-Final Office Action for U.S. Appl. No. 17/672,639 (dated Aug. 25, 2022).
Notice of Allowance for U.S. Appl. No. 17/200,777 (dated Jun. 30, 2022).
Final Office Action for U.S. Appl. No. 17/082,871 (dated Jun. 6, 2022).
Notice of Allowance for U.S. Appl. No. 17/009,725 (dated Jun. 13, 2022).
Commonly-Assigned, co-pending U.S. Appl. No. 17/672,639 for "Methods, Systems, and Computer Readable Media for Dynamic Optimized Network Function Discovery for Consumer Network Functions" (Unpublished, filed Feb. 5, 2022).
"3rd Generation Partnership Project; Technical Specification Group Core Network and Terminals; 5G System; Network Function Repository Services, Stage 3 (Release 16)," 3GPP TS 29.510, V16.6.0, pp. 1-227 (Jan. 2021).
Notification of Transmittal of the International Search Report and the Written Opinion of the International Searching Authority, or the Declaration for International Application No. PCT/US2022/019848 (dated Jun. 14, 2022).
Advisory Action and Examiner-Initiated Interview Summary for U.S. Appl. No. 16/945,794 (dated May 20, 2022).
Final Office Action for U.S. Appl. No. 16/945,794 (dated Feb. 8, 2022).
Non-Final Office Action for U.S. Appl. No. 17/082,871 (dated Feb. 7, 2022).

Commonly-Assigned, co-pending U.S. Appl. No. 17/543,989 for "Methods, Systems, and Computer Readable Media for Dynamic Adjustment to Network Function Profile for Discovery Responses" (Unpublished, filed Dec. 17, 2021).
Commonly-Assigned, co-pending U.S. Appl. No. 17/356,461 for "Methods, Systems and Computer Readable Media for Optimizing Network Traffic Distribution using Timeslot-Based Tracked Producer Network Function (NF) Performance During Producer NF Selection" (Unpublished, filed Jun. 23, 2021).
Commonly-Assigned, co-pending U.S. Appl. No. 17/485,284 for "Methods, Systems and Computer Readable Media For Providing Priority Resolver for Resolving Priorities and Network Function (NF) Instances" (Unpublished, filed Sep. 24, 2021).
Notice of Allowance and Fee(s) Due for U.S. Appl. No. 16/356,446 (dated Sep. 30, 2021).
Notification of Transmittal of the International Search Report and the Written Opinion of the International Searching Authority, or the Declaration for International Application No. PCT/US2021/033031 (dated May 18, 2021).
Non-Final Office Action for U.S. Appl. No. 16/945,794 (dated Sep. 15, 2021).
Commonly-Assigned, co-pending U.S. Appl. No. 17/468,076 for "Methods, Systems, and Computer Readable Media for Using Service Communications Proxy (SCP) or Security Edge Protection Proxy (SEPP) to Apply or Override Preferred-Locality Attribute During Network Function (NF) Discovery" (Unpublished, filed Sep. 7, 2021).
Commonly-Assigned, co-pending U.S. Appl. No. 17/487,142 for "Methods, Systems, and Computer Readable Media for Network Function Discovery Using Preferred-Locality Information" (Unpublished, filed Sep. 28, 2021).
"3rd Generation Partnership Project; Technical Specification Group Services and System Aspects; Security architecture and procedures for 5G system (Release 17)," 3GPP TS 33.501, V17.3.0, pp. 1-258 (Sep. 2021).
"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).
"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).
"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).
"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
"3rd Generation Partnership Project; Technical Specification Group Core Network and Terminals; 5G System; Public Land Mobile Network (PLMN) Interconnection; Stage 3 (Release 17)," 3GPP Ts 29.573, V17.0.0, pp. 1-100 (Mar. 2021).
Commonly-Assigned, co-pending U.S. Appl. No. 17/203,693 for "Methods, Systems, and Computer Readable Media for Hypertext

(56) References Cited

OTHER PUBLICATIONS

Transfer Protocol (HTTP) Stream Tuning for Load and Overload Control," (Unpublished, filed Mar. 16, 2021).

"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).

Vixie et al., "Dynamic Updates in the Domain Name System (DNS Update)," Network Working Group, RFC 2136, pp. 1-26 (Apr. 1997).

Examiner-Initiated Interview Summary for U.S. Appl. No. 17/672,639 (dated Mar. 7, 2023).

Notice of Publication for European Patent Application No. 21713526.8 (dated May 10, 2023).

Examiner-Initiated Interview Summary for U.S. Appl. No. 17/672,639 (dated Apr. 21, 2023).

Non-Final Office Action for U.S. Appl. No. 17/487,142 (dated May 8, 2023).

Non-Final Office Action for U.S. Appl. No. 17/468,076 (dated Apr. 28, 2023).

Final Office Action for U.S. Appl. No. 17/397,968 (dated Apr. 27, 2023).

Non-Final Office Action for U.S. Appl. No. 17/543,989 (dated Mar. 28, 2023).

Notice of Allowance for U.S. Appl. No. 17/672,639 dated Mar. 20, 2023.

Examiner-Initiated Interview Summary for U.S. Appl. No. 17/397,968 (dated Mar. 21, 2023).

Examination Report for Patent Application No. IN202147036462 (dated Dec. 29, 2022).

Notice of Publication for U.S. Appl. No. 17/356,461 (dated Dec. 29, 2022).

Ex Parte Quayle Action for U.S. Appl. No. 17/672,639 (Dec. 23, 2022).

Notice of Publication for International Application Serial No. PCT/US2022/031566 (dated Dec. 8, 2022).

Non-Final Office Action for U.S. Appl. No. 17/397,968 (dated Dec. 9, 2022).

"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).

Non-Final Office Action for U.S. Appl. No. 17/397,968 (dated Aug. 23, 2023).

Notice of Publication for European Patent Application Serial No. 21731870.8 (dated Aug. 9, 2023).

Applicant-Initiated Interview Summary for U.S. Appl. No. 17/397,968 (dated Jul. 24, 2023).

Applicant-Initiated Interview Summary for U.S. Appl. No. 17/543,989 (dated Jul. 24, 2023).

First Examination Report for Indian Patent Application Serial No. 202247065596 (dated May 30, 2023).

Notice of Publication for European Patent Application Serial No. 21718460.5 (dated Jun. 14, 2023).

Advisory Action for U.S. Appl. No. 17/397,968 (dated Jul. 14, 2023).

Notice of Allowance and Fee(s) Due for U.S. Appl. No. 17/543,989 (dated Sep. 13, 2023).

Notice of Allowance and Fee(s) Due for U.S. Appl. No. 17/487,142 (dated Sep. 1, 2023).

Applicant-Initiated Interview Summary for U.S. Appl. No. 17/468,076 (dated Sep. 22, 2023).

\* cited by examiner

METHODS, SYSTEMS, AND COMPUTER READABLE MEDIA FOR APPLYING OR OVERRIDING PREFERRED LOCALITY CRITERIA IN PROCESSING NETWORK FUNCTION (NF) DISCOVERY REQUESTS

TECHNICAL FIELD

The subject matter described herein relates to processing NF discovery requests. More particularly, the subject matter described herein relates to methods, systems, and computer readable media for applying or overriding preferred locality criteria in processing NF discovery requests.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is that during NF discovery, a consumer NF may specify a preferred-locality parameter in the NF discovery request that has no meaning to the NRF in the network of the NRF, or the consumer NF may not specify a preferred-locality parameter in the NF discovery request. In either case, the NRF that receives the NF discovery request may utilize query parameters in the NF discovery request to generate a prioritized list of NF profiles of producer NFs that match the query parameters. In generating the prioritized list, the NRF uses the registered priority of each producer NF and the preferred-locality information, if present, to set the priorities of producer NF profiles returned to the consumer NF in the discovery response. For example, the NRF may prioritize producer NFs with localities that match the preferred-locality attribute in the discovery request over producer NFs with localities that do not match the preferred-locality attribute in the discovery request. If the preferred-locality parameter is not present in the NF discovery request or if the preferred-locality parameter has no meaning to the NRF because it specifies a locality in another network, the priorities in the list will be set based on the registered priorities of the producer NFs alone, which may result in producer NFs that are farther away from the consumer NF being assigned lower priorities (more preferred) than producer NFs that are closer to the consumer NF. As a result, when selecting a producer NF from the list to provide a service, the consumer NF may select a producer that is farther away from the consumer NF than another producer NF, resulting in increased latency in service communications.

In light of these and other difficulties there exists a need for methods systems and computer readable media for applying or overriding preferred-locality criteria in processing NF discovery requests.

SUMMARY

A method for applying or overriding preferred-locality criteria in processing network function (NF) discovery requests includes, at an NF repository function (NRF) including at least one processor, maintaining an NF profiles database including NF profiles of producer NFs registered to provide service to other NFs, receiving, from an NF, an NFDiscover request including a preferred-locality attribute or lacking a preferred-locality attribute, accessing the NF profiles database to identify NF profiles of producer NFs capable of providing a service indicated by query parameters in the NFDiscover request, generating an NFDiscover response including the NF profiles identified as capable of providing the service indicated by the query parameters in the NFDiscover request, prioritizing the NF profiles in the NFDiscover response in a manner that overrides the preferred-locality attribute in the NFDiscover request or applies a preferred locality attribute selected by the NRF when the NFDiscover request does not include a preferred locality attribute, and transmitting the NFDiscover response to the NF that transmitted the NFDiscover request.

According to another aspect of the subject matter described herein, receiving the NFDiscover request includes receiving the NFDiscover request including a preferred-locality attribute set by the NF and prioritizing the NF profiles includes overriding the preferred-locality attribute selected by the NF with the preferred-locality attribute selected by the NRF.

According to another aspect of the subject matter described herein, overriding the preferred-locality attribute set by the NF with the preferred-locality attribute selected by the NRF includes overriding the preferred-locality attribute selected by the NF with a preferred-locality attribute selected by the NRF that indicates a locality of the NRF.

According to another aspect of the subject matter described herein, overriding the preferred-locality attribute set by the NF with the preferred-locality attribute selected by the NRF includes overriding the preferred-locality attribute selected by the NF with a preferred-locality attribute selected by the NRF that indicates a nearest locality to a locality of the NRF or locality of the NRF itself or any other operator configured locality to override.

According to another aspect of the subject matter described herein, overriding the preferred-locality attribute set by the NF with the preferred-locality attribute selected by the NRF includes overriding the preferred locality attribute selected by the NF with a preferred locality attribute selected by the NRF that indicates a nearest locality to the NRF with at least one heart-beating producer NF capable of providing the service indicated by the query parameters in the NFDiscover request or the locality of the NRF itself or any other operator configured locality to override.

According to another aspect of the subject matter described herein, receiving the NFDiscover request includes receiving the NFDiscover request without a preferred-locality attribute and prioritizing the NF profiles includes applying the preferred-locality attribute selected by the NRF.

According to another aspect of the subject matter described herein, applying the preferred-locality attribute set selected by the NRF includes applying a preferred-locality attribute selected by the NRF that indicates a locality of the NRF.

According to another aspect of the subject matter described herein, applying the preferred-locality attribute selected by the NRF includes applying a preferred-locality attribute selected by the NRF that indicates a nearest locality to a locality of the NRF.

According to another aspect of the subject matter described herein, applying the preferred-locality attribute selected by the NRF includes applying a preferred-locality attribute selected by the NRF that indicates a nearest locality to a locality of the NRF. with at least one heart-beating producer NF capable of providing the service indicated by the query parameters in the NFDiscover request.

According to another aspect of the subject matter described herein, receiving the NFDiscover request includes receiving an inter-public land mobile network (PLMN) NFDiscover request or an intra-PLMN NFDiscover request.

According to another aspect of the subject matter described herein, a system for applying or overriding preferred locality criteria in processing network function (NF) discovery requests is provided. The system includes an NF repository function (NRF) including at least one processor and a memory. The system further includes an NF profiles database stored in the memory and including NF profiles of producer NFs registered to provide service to other NFs. The system further includes an NF profiles manager implemented by the at least one processor for receiving, from an NF, an NFDiscover request including a preferred-locality attribute or lacking a preferred-locality attribute, accessing the NF profiles database to identify NF profiles of producer NFs capable of providing a service indicated by query parameters in the NFDiscover request, generating an NFDiscover response including the NF profiles identified as capable of providing the service indicated by the query parameters in the NFDiscover request, prioritizing the NF profiles in the NFDiscover response in a manner that overrides the preferred-locality attribute in the NFDiscover request or applies a preferred locality attribute selected by the NRF when the NFDiscover request does not include a preferred locality attribute, and transmitting the NFDiscover response to the NF that transmitted the NFDiscover request.

According to another aspect of the subject matter described herein, the NFDiscover request includes a preferred-locality attribute set by the NF and, in prioritizing the NF profiles, the NF profiles manager is configured to override the preferred-locality attribute selected by the NF with the preferred-locality attribute selected by the NRF.

According to another aspect of the subject matter described herein, the preferred-locality attribute selected by the NRF indicates a locality of the NRF.

According to another aspect of the subject matter described herein, the preferred-locality attribute selected by the NRF indicates a nearest locality to a locality of the NRF.

According to another aspect of the subject matter described herein, the preferred-locality attribute selected by the NRF indicates a nearest locality to a locality of the NRF with at least one heart-beating producer NF capable of providing the service indicated by the query parameters in the NFDiscover request.

According to another aspect of the subject matter described herein, the preferred-locality attribute selected by the NRF indicates an operator configured locality.

According to another aspect of the subject matter described herein, the NFDiscover request does not include a preferred-locality attribute and, in prioritizing the NF profiles, the NF profiles manager is configured to apply the preferred-locality attribute selected by the NRF.

According to another aspect of the subject matter described herein, a non-transitory computer readable medium having stored thereon executable instructions that when executed by a processor of a computer control the computer to perform steps is provided. The steps are performed at a network function (NF) repository function (NRF). The steps include maintaining an NF profiles database including NF profiles of producer NFs registered to provide service to other NFs. The steps further include receiving, from an NF, an NFDiscover request including a preferred-locality attribute or lacking a preferred-locality attribute. The steps further include accessing the NF profiles database to identify NF profiles of producer NFs capable of providing a service indicated by query parameters in the NFDiscover request. The steps further include generating an NFDiscover response including the NF profiles identified as capable of providing the service indicated by the query parameters in the NFDiscover request. The steps further include prioritizing the NF profiles in the NFDiscover response in a manner that overrides the preferred-locality attribute in the NFDiscover request or applies a preferred locality attribute selected by the NRF when the NFDiscover request does not include a preferred locality attribute. The steps further include transmitting the NFDiscover response to the NF that transmitted the NFDiscover request.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
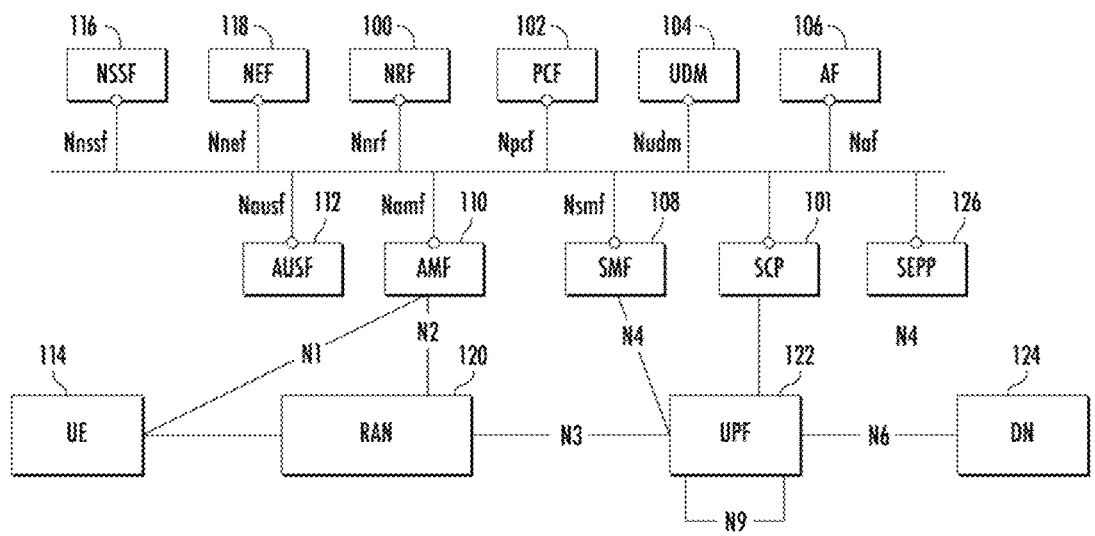
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem in 5G networks is that during NF discovery, a consumer NF either doesn't specify a preferred-locality attribute or specifies a preferred-locality attribute that has no meaning in the network of the receiving NRF. As a result, suboptimal producer NF selection can occur. During registration with the NRF, each producer NF can specify its locality as a registration attribute or parameter, which is stored by the NRF in a data structure referred to as an NF profile or NF profile object. The registration process is conducted according to 3GPP TS 29.510 where each NF sends an NF register message to NRF 100. The NF register message includes the NF profile of each NF. Table 6.1.6.2.2-1 of 3GPP TS 29.510 defines the attributes that may be included in an NF profile. Of interest to the subject matter described herein is the locality attribute of the NF profile. Table 1 shown below is an excerpt from Table 6.1.6.2.2-1 of 3GPP TS 29.510 illustrating the locality attribute.

TABLE 1

Locality Attribute of NF Profile

| Attribute name | Data type | P | Cardinality | Description |
|---|---|---|---|---|
| Locality | string | O | 0 ... 1 | Operator defined information about the location of the NF instance (e.g. geographic location, data center) (NOTE 3) |

(NOTE 3):
A requester NF may use this information to select a NF instance (e.g. a NF instance preferably located in the same data center).

As illustrated by Table 1, the locality attribute stores operator-defined information about the location of an NF instance, such as geographic location and data center. According to Note 3 of Table 1, the locality attribute can be used during NF discovery to select a producer NF that is in the same data center as the requesting consumer NF. However, the consumer NF may not know the correct locality attribute to specify in a discovery request message, which can result in sub-optimal NF selection.

The preferred-locality is an optional attribute that may be included in an NFDiscover request message. Table 2 shown below is an excerpt from Table 6.2.3.2.3.1-1 of 3GPP TS 29.510 and indicates how the NRF processes the preferred-locality attribute in an NFDiscover request.

TABLE 2

NRF Processing of Preferred-Locality Attribute

| Attribute Name | Data Type | P | Cardinality | Description | Applicability |
|---|---|---|---|---|---|
| Preferred-locality | String | O | 0 ... 1 | Preferred target NF location (e.g. geographic location, data center). When present, the NRF shall prefer NF profiles with a locality attribute that matches the preferred-locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. (NOTE 6) | |

From Table 2, when the preferred-locality attribute is present, the NRF should prefer NF profiles with a locality attribute that matches the preferred-locality in an NFDiscover request. The NRF may also return additional NF profiles in the discovery response not matching the preferred locality, for example, if no NF profile is found matching the preferred locality. The NRF may also set a lower priority for additional NF profiles in the discovery response that do not match the preferred locality.

Thus, during NF discovery, preferred-locality is an optional attribute sent by consumer NFs during discovery that, when present, would be configured by the network operator to indicate a preferred location of a producer NF that would serve the consumer NF. Typically, the preferred-locality of a consumer NF would be the locality of the consumer NF or the locality of a preferred producer NF. The NRF should set a less-preferred (higher in number according to the 3GPP-defined priority numbering scheme where lower priority numbers indicate more preferred priorities) priority for any additional NFs in a discovery response with a registered locality parameter that does not match the preferred locality identified in an NFDiscover request. NF profiles that match the discovery request's search criteria will be ordered as follows:

Preferred Locality
Registered Priority

Challenges associated with current NF discovery methods include:

Inter-PLMN discovery requests from outside of the PLMN of the NRF processing the discovery requests either don't include a preferred-locality attribute or include a preferred-locality attribute that has no meaning in the PLMN of the NRF. Network operators may be unwilling to share locality attributes across PLMN boundaries. As a result, an NFDiscover request may not include a preferred-locality attribute that matches a locality in the PLMN of the NRF.

Figure 2:
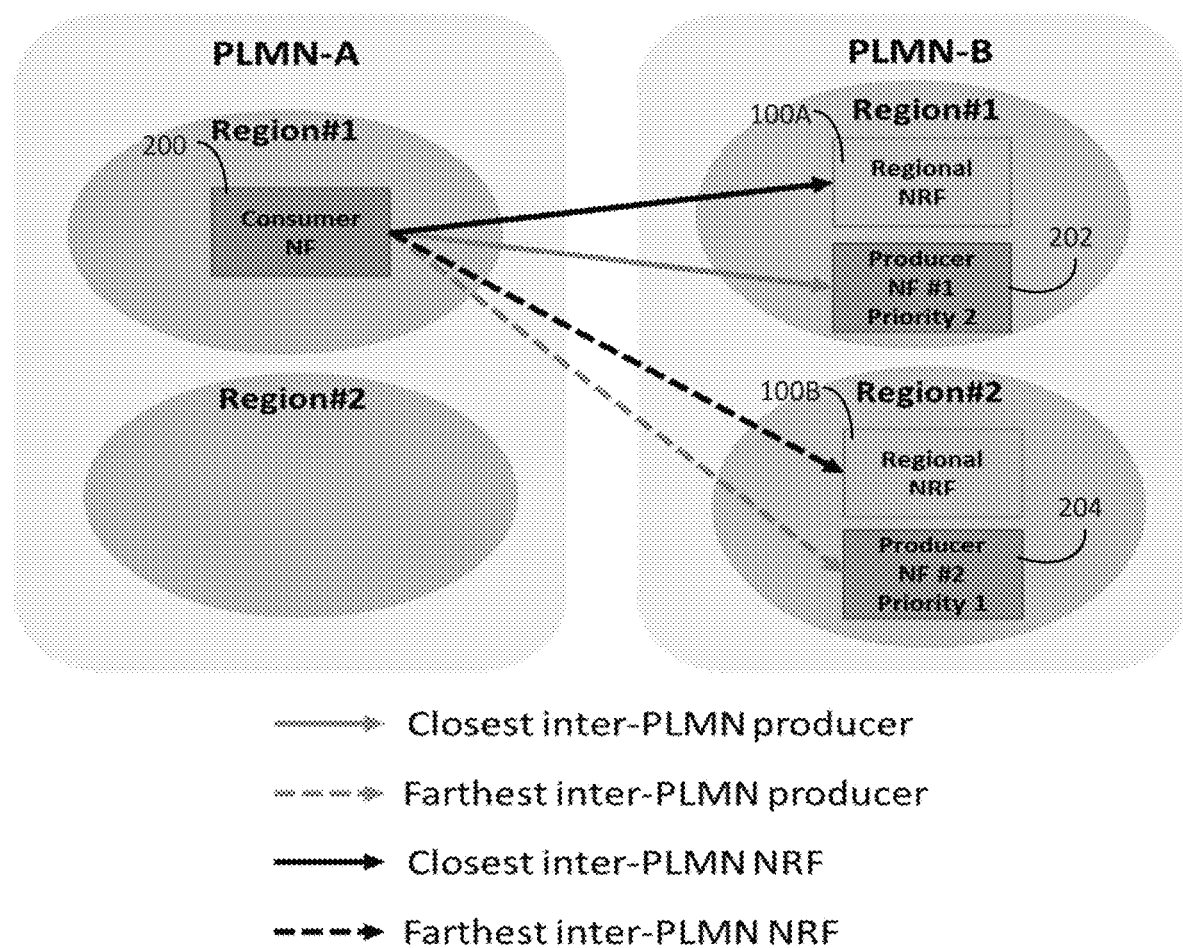
FIG. 2 is a network diagram illustrating an inter-PLMN use case for applying or overriding preferred locality criteria in processing NF discovery requests.

In most cases, these inter-PLMN discovery requests land on NRFs in other PLMNs in a region near the consumer NF. In FIG. 2, Region #1 in PLMN-A is shown to be near Region #1 in PLMN-B and far from Region #2 in PLMN-B. Therefore, in most cases, inter-PLMN discovery requests from consumer NF 200 will land on regional NRF 100A in Region #1 of PLMN-B.

In the absence of a preferred-locality attribute in the NF discovery request, the list of NF profiles of producer NFs returned in the discovery response may prefer producer NFs located farther from the consumer NF than other producer NFs that are less preferred (higher priority) in the list. In FIG. 2, in the absence of a preferred-locality attribute, the NF profiles of producer NFs returned by NRF 100A may be in the following order {Producer NF #2 204 (Priority-1), Producer NF #1 202 (Priority-2)}, i.e., based on priority.

With this priority order, consumer NF 200 will most likely select producer NF #2 204 (Priority-1) to process a service request, which will result in an unnecessarily costly communication path for consumer NF 200, because producer NF #2 204 is farther from consumer NF 200 than producer NF #1 202.

Figure 3:
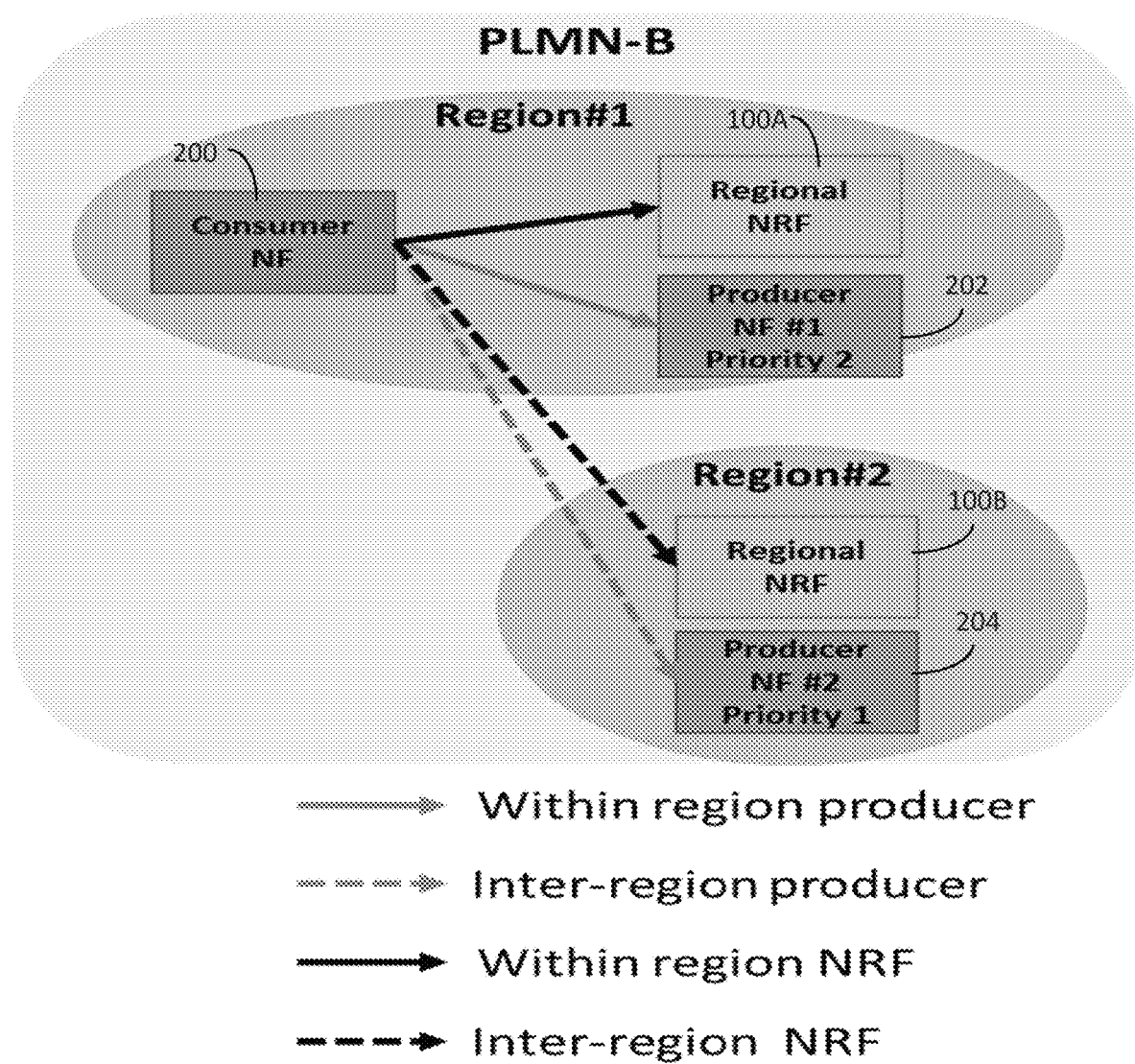
FIG. 3 is a network diagram illustrating an intra-PLMN use case for applying or overriding preferred locality criteria in processing NF discovery requests.

The above-described challenge also applies to intra-PLMN discovery use-cases, as illustrated in FIG. 3, where the intra-PLMN discovery either don't have preferred-locality attributes or have preferred-locality attributes with no meaning in the region of the NRF. In most cases, the discovery requests will land on the nearest regional NRF. In FIG. 3 intra-PLMN discovery requests from consumer NF 200 will likely land on regional NRF 100A. Regional NRF 100A will select NF profiles of NF's that match the query parameters in the discovery request and produce a prioritized list of NF profiles that it sends to consumer NF 200 in a discovery response. Because producer NF #2 204 has a lower priority than producer NF #1 202, NRF 100A will prioritize producer NF #2 204 over producer NF #1 202. As with the inter-PLMN discovery case, this will result in suboptimal producer NF selection as consumer NF 200 will select producer NF #2 204 to process service requests, even though producer NF #1 202 is closer.

Figure 4:
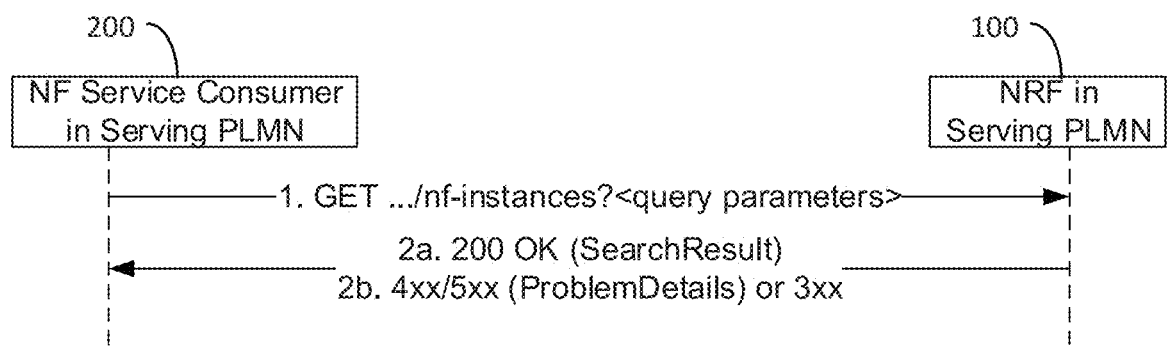
FIG. 4 is a message flow diagram illustrating exemplary messages exchanged between a consumer NF and an NRF during NF discovery.

FIG. 4 is a message flow diagram illustrating exemplary messages exchanged between an NF service consumer and an NRF in performing NF discovery. In line 1 of the message flow diagram illustrated in FIG. 4, NF service consumer 200 initiates the NF discovery process by sending and HTTP GET message to NRF 100. The HTTP GET message sent to the NRF to obtain service profiles of NF instances is also referred to as an NFDiscover request or NF discovery request. The HTTP GET message includes query parameters (such as NFtype) that the NRF uses to locate NF profiles of producer NFs that can provide the service identified by the query parameters or attributes. One such parameter or attribute is the preferred-locality attribute. If NF service consumer 200 is capable of formulating and NF discover message with a preferred-locality attribute that corresponds to a region within the PLMN of NRF 100, then the preferred-locality attribute can be effectively used to select a producer NF that is closer to consumer NF 200 than other producer NFs. However, if NF service consumer 200 is incapable of including a preferred-locality parameter or does not include a preferred-locality parameter that has meaning in the PLMN of NRF 100, NRF 100 may prioritize the list of NF profiles returned to consumer NF 200 in the discovery response based on registered producer NF priorities, which can result in suboptimal NF selection, as illustrated in FIGS. 2 and 3.

In lines 2A and 2B of the message flow diagram in FIG. 4, if the NF discovery request is successfully processed, NRF 100 responds with a 200 OK message that includes NF profile objects corresponding to the NF profiles of producer NFs that are able to provide the service identified in the discovery request. If the NF discovery process is not successful, NRF 100 may return a 4xx or 5xx message with problem details.

If the NF discovery request is redirected to another NRF, NRF 100 will return a 3xx message. It should be noted that the subject matter described herein applies to NF discovery requests from an NRF in a PLMN serving a consumer NF to an NRF in a home PLMN, as detailed in Section 5.3.2.2.3 of 3GPP TS 29.510 and service discovery where an intermediate forwarding NRF receives the NF discovery request from the consumer NF and forwards the NF discovery request to the NRF in another network or region as detailed in Section 5.2.2.2.5 of 3GPP TS 29.510. The NRF that receives the forwarded NF discovery request performs the look up in the NF profiles database to extract NF profiles that match the query parameters in the NF discovery request.

In order to avoid suboptimal NF selection, the subject matter described herein includes an NRF that can process NF discovery requests both with and without a preferred locality parameter and use locality information maintained by the NRF to apply to or override preferred locality information in the NF discovery request when processing the NF discovery request. In the case where the NRF receives an inter-PLMN discovery request without a preferred-locality parameter or with a preferred-locality parameter that the NRF chooses to override, the NRF can choose to process the list of matching producer NFs:

using the locality of the NRF;
using the locality nearest to the NRF; or
using the nearest locality to the NRF having at least one registered (successfully heart-beating) producer NF instance that matches the query parameters in the NF discovery request.

In the case where the NRF receives an intra-PLMN discovery request with or without a preferred-locality parameter, it can again choose to override the preferred-locality parameter in the NF discovery request or apply an NRF-selected parameter and process the list of matching producer NFs:

using the locality of the NRF;
using the locality nearest to the NRF; or
using the nearest locality to the NRF having at least one registered (successfully heart-beating) producer NF instance that matches the query parameters in the NF discovery request.

In any of the above described cases, processing the list of matching NFs means that the NRF uses either its own locality, a nearest locality (to the NRF), or a nearest locality with a matching heart-beating producer NF to set priorities in the list of NF profiles returned to the NF service consumer.

Figure 5:
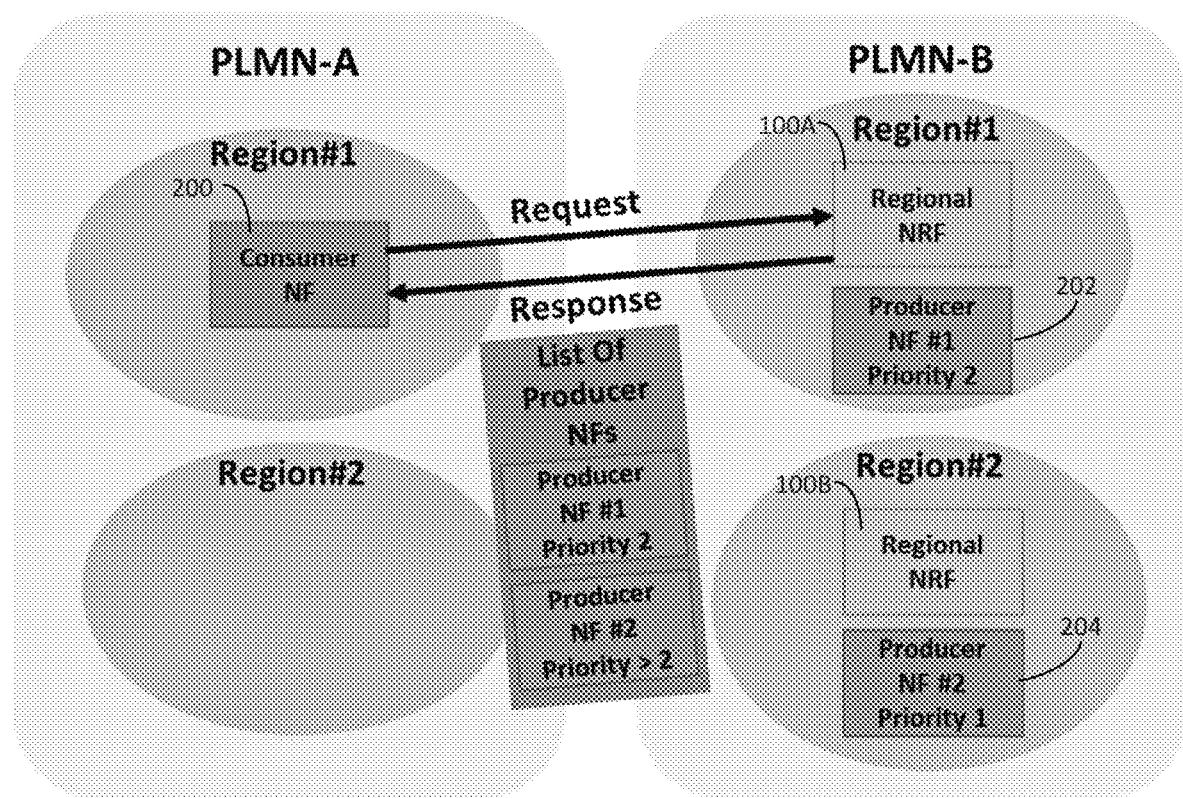
FIG. 5 is a message flow diagram illustrating exemplary messages exchanged for an inter-PLMN use case where the NRF applies or overrides preferred locality criteria in processing an NF discovery request.

FIG. 5 is a message flow diagram illustrating an NRF that applies or overrides a preferred-locality attribute in processing an inter-PLMN discovery request. Referring to FIG. 5, producer NFs 202 and 204 are respectively located in Region #1 and Region #2 of PLMN-B, and consumer NF 200 is located in Region #1 of PLMN-A. Region #1 of PLMN B is geographically closer to Region #1 of PLMN-A than Region #2 of PLMN-B is to Region #1 of PLMN-A. Producer NF #1 202 has registered its NF profile with NRF 100 with a priority of 2. Producer NF #2 204 has registered its NF profile with NRF 100A with a priority of 1, which means that, absent a priority override mechanism, NRF 100A would indicate in a discovery response to consumer NF 200 that producer NF #2 204 is more preferred than producer NF #1 202, which would result in sub-optimal producer NF selection.

In the illustrated example, when consumer NF 200 located in PLMN-A sends a discovery request to NRF 100A located in Region #1 of PLMN B, the discovery request may either lack a preferred-locality attribute or may include a preferred-locality attribute that corresponds to the consumer NF's locality (Region #1) in PLMN-A, which has no meaning in PLMN B. In response to receiving such a discovery request, NRF 100A may either override the preferred-locality attribute or apply an NRF-selected locality attribute, depending on whether the discovery request has a preferred-locality attribute. For example, if the NF discovery request has a preferred-locality attribute, NRF 100A may override the preferred-locality attribute in the NF discovery request when prioritizing the NF profiles in the list of NF profiles to return to consumer NF 200. If the NF discovery request lacks a preferred-locality attribute, NRF 100A may apply or use an NRF-selected locality attribute when prioritizing the NF profiles in the list of NF profiles to return to consumer NF 200.

In one example, NRF 100A may use its own locality when overriding or applying the locality to process the discovery request. In another example, NRF 100A may utilize the closest locality to the NRF and/or the closest locality to the NRF with a heart-beating producer NF capable of providing the service identified from the query parameters in the discovery request. A consumer NF is likely to send an NF discovery request to an NRF that is in a region or PLMN that is close to the requesting consumer NF. As a result, using the NRF's own locality, the closest locality known to the NRF, a locality configured by the network operator, and/or the closest locality to the NRF with a heart-beating producer NF that matches the query parameters to process the discovery request has a good chance of producing a list of NF profiles of producer NFs that are closer to the requesting consumer NF with lower (more preferred) priorities than NF profiles of producer NFs that are farther away from the requesting consumer NF.

In the illustrated example, NRF 100A returns a prioritized list of NF profiles with the NF profile of producer NF #1 202 having a lower priority (more preferred) than producer NF #2 204. As a result, when consumer NF 200 selects a producer NF to process a service request, consumer NF 200 will select producer NF #1 202 to process the service request over producer NF #2 204, which will result in more efficient and lower latency service communications in the core network over the scenario illustrated in FIG. 2. As stated above with regard to FIG. 4, it is not necessary that the discovery request originate from consumer NF 200. The discovery request may originate from an NRF on behalf of consumer NF 200 in the redirecting or inter-PLMN cases as described in 3GPP TS 29.510. The NF discovery request may also originate from an SCP. The locality-based override or application processes described herein can be used by the NRF in processing NF discovery requests originating from consumer NFs, SCPs, or other NRFs.

It should be noted that in FIG. 5, NRF 100A assigns priorities to the NF profiles in the NF discovery response that override the priorities registered for the NF profiles in NRF 100A. Overriding the priorities means that NRF 100A assigns new priorities based on the locality of NRF 100A or the locality of the nearest producer NF that is available and capable of handling the service identified in the discovery request. The priorities registered by the producer NFs 202 and 204 may be considered when there are multiple NFs at the same locality capable of handling or providing the service identified in the NF discovery request.

Figure 6:
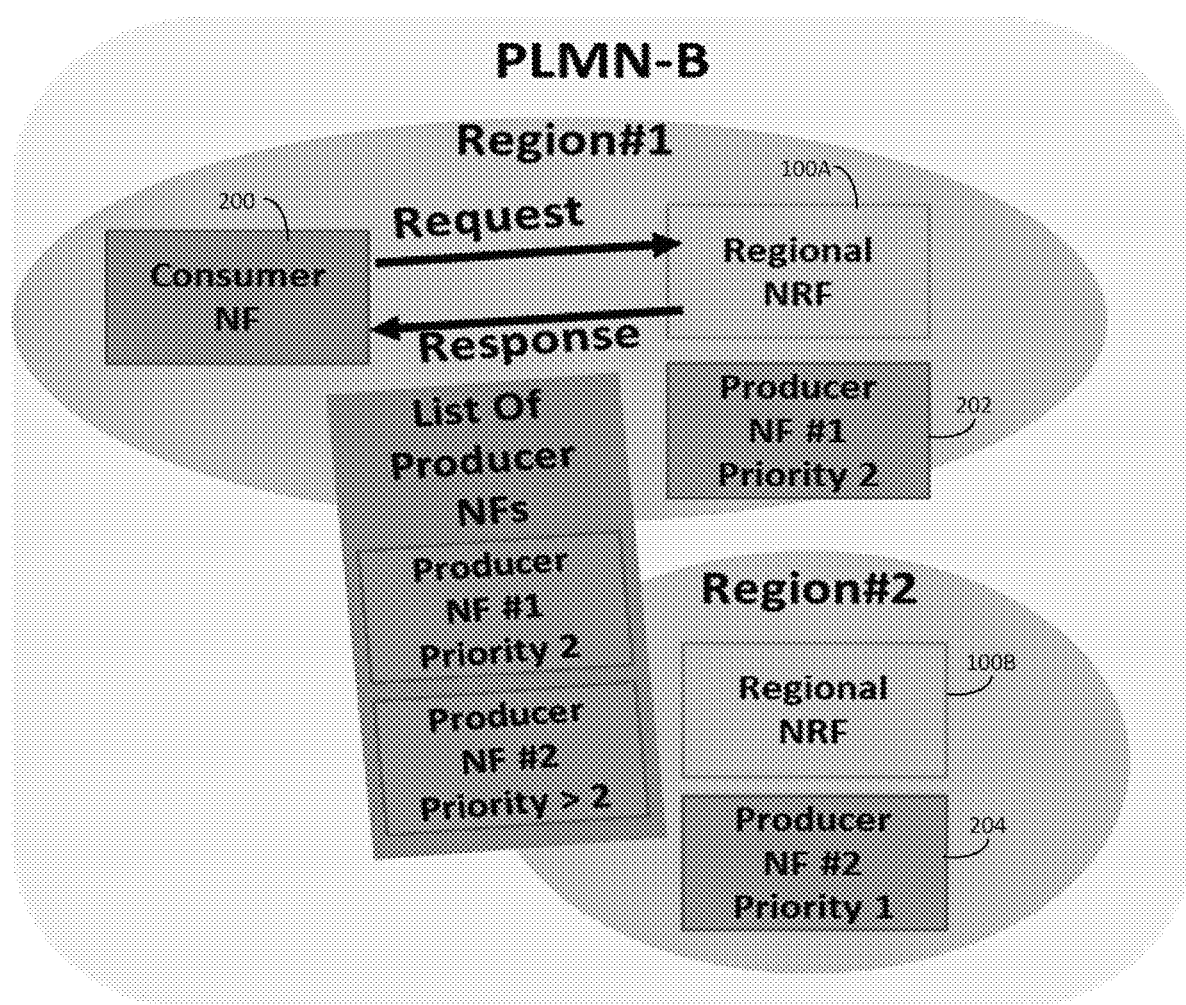
FIG. 6 is a message flow diagram illustrating exemplary messages exchanged when for the intra-PLMN use case where the NRF applies or overrides preferred locality criteria in processing an NF discovery request.

Overriding or applying a preferred locality to an NF discovery request also applies to an intra-PLMN discovery request, i.e., a discovery request sent from an NF to an NRF that are both in the same PLMN. FIG. 6 illustrates this case. Referring to FIG. 6, producer NFs 202 and 204 are respectively located in Region #1 and Region #2 of PLMN-B, and consumer NF 200 is located in Region #1 of PLMN-B. Producer NF #1 202 has registered its NF profile with NRF 100 with a priority of 2. Producer NF #2 204 has registered its NF profile with NRF 100A with a priority of 1, which means that, absent a priority override mechanism, NRF 100A would indicate in a discovery response to consumer NF 200 that producer NF #2 204 is more preferred than producer NF #1 202, which would result in sub-optimal producer NF selection.

In the illustrated example, when consumer NF 200 located in Region #1 of PLMN-B sends a discovery request to NRF 100A, which is also located in Region #1 of PLMN B, the discovery request may either lack a preferred-locality attribute or may include a preferred-locality attribute that corresponds to the consumer NF's locality (Region #1) in PLMN-B. In response to receiving such a discovery request, NRF 100A may either override the preferred-locality attribute or apply an NRF-selected preferred locality attribute, depending on whether the discovery request has a preferred-locality attribute. For example, if the NF discovery request has a preferred-locality attribute, NRF 100A may override the preferred-locality attribute in the NF discovery request when prioritizing the NF profiles in the list of NF profiles to return to consumer NF 200. If the NF discovery request lacks a preferred-locality attribute, NRF 100A may apply or use an NRF-selected locality attribute when prioritizing the NF profiles in the list of NF profiles to return to consumer NF 200.

In one example, NRF 100A may use its own locality when overriding or applying the locality to process the discovery request. In another example, NRF 100A may utilize the closest locality to the NRF and/or the closest locality to the NRF with a heart-beating producer NF capable of providing the service identified from the query parameters in the discovery request. A consumer NF is likely to send an NF discovery request to an NRF that is in a region or PLMN that is close to the requesting consumer NF. As a result, using the NRF's own locality, the closest locality known to the NRF, and/or the closest locality to the NRF with a heart-beating producer NF that matches the query parameters to process the discovery request has a good chance of producing a list of NF profiles of producer NFs that are closer to the requesting consumer NF with lower (more preferred) priority than NF profiles of producer NFs that are farther away from the requesting consumer NF.

In the illustrated example, NRF 100A returns a prioritized list of NF profiles with the NF profile of producer NF #1 202 having a lower priority (more preferred) than producer NF #2 204. As a result, when consumer NF 200 selects a producer NF to process a service request, consumer NF 200 will select producer NF #1 202 to process the service request over producer NF #2 204, which will result in more efficient and lower latency service communications in the core network over the scenario illustrated in FIG. 4.

It should be noted that in FIG. 6, like the inter-PLMN case illustrated in FIG. 5, NRF 100A assigns priorities to the NF profiles in the NF discovery response that override the priorities registered for the NF profiles in NRF 100A. Overriding the priorities means that NRF 100A assigns new priorities based on the locality of NRF 100A or the locality of the nearest producer NF that is available and capable of handling the service identified in the discovery request. The priorities registered by the producer NFs 202 and 204 may be considered when there are multiple NFs at the same locality capable of handling or providing the service identified in the NF discovery request.

Figure 7:
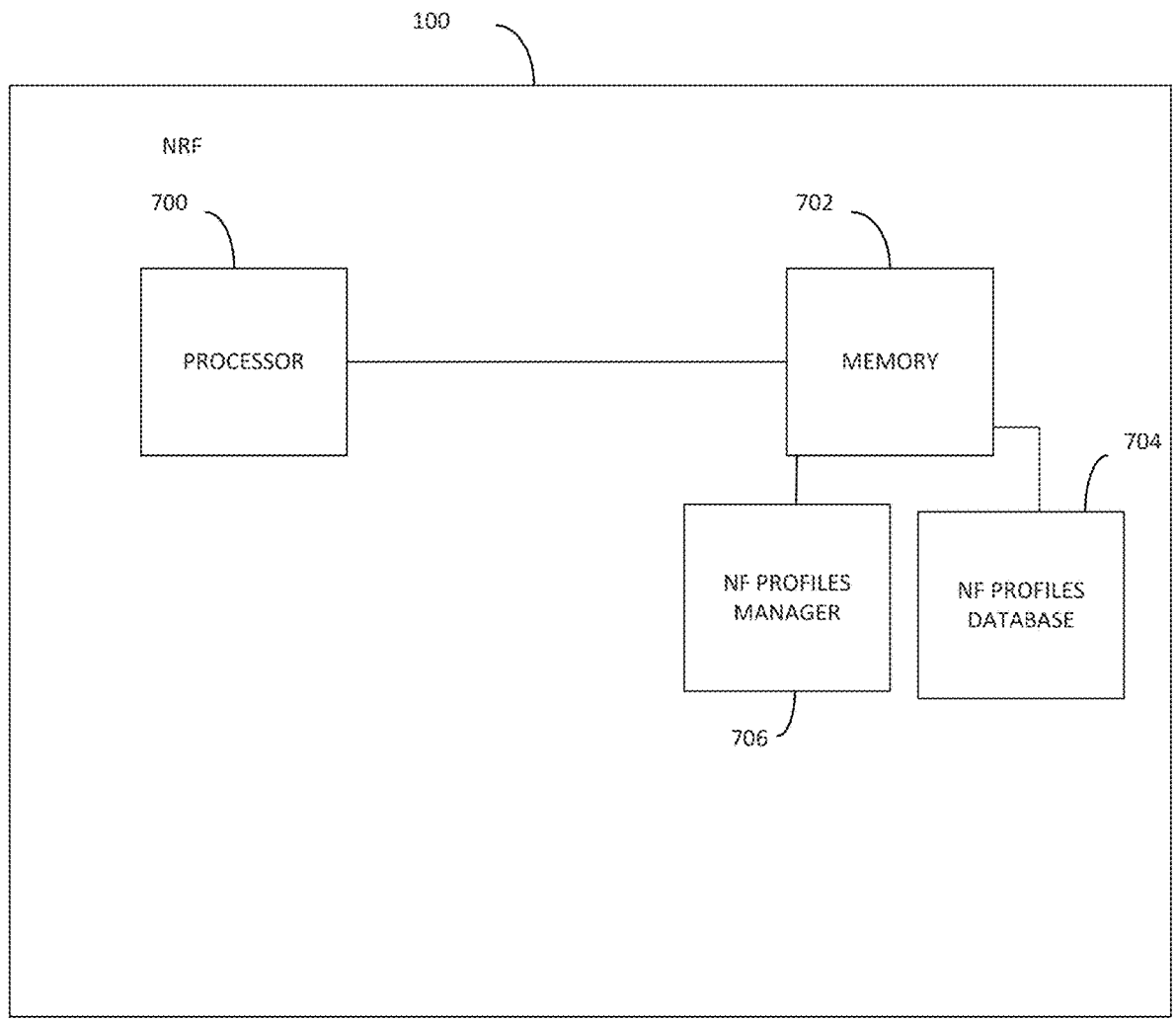
FIG. 7 is a block diagram illustrating an exemplary architecture for an NRF applying or overriding preferred locality criteria in processing NF discovery requests.

FIG. 7 is a block diagram illustrating an exemplary architecture for NRF 100 that is capable of applying or overriding a preferred locality during NF discovery. Referring to FIG. 7, NRF 100 includes at least one processor 700 and a memory 702. NRF 100 further includes an NF profiles database 704 that stores the NF profiles of producer NFs that are registered with NRF 100. NRF 100 further includes an NF profiles manager 706 that registers producer NFs with NRF 100 by receiving and processing NF register request messages and storing the NF profiles in memory 702. NF profiles manager 706 may also perform the steps described herein for processing NF discovery requests, including applying or overriding a preferred locality in processing the NF discovery requests. NF profiles manager 706 may be implemented using computer executable instructions stored in memory 702 and executed by processor 700. NRF 100 illustrated in FIG. 7 could be one of many instances scaled up within a single NRF deployment. In this case the NF profiles database 704 will replicate the NF profiles of producer NFs that are registered with other NRF instances.

Figure 8:
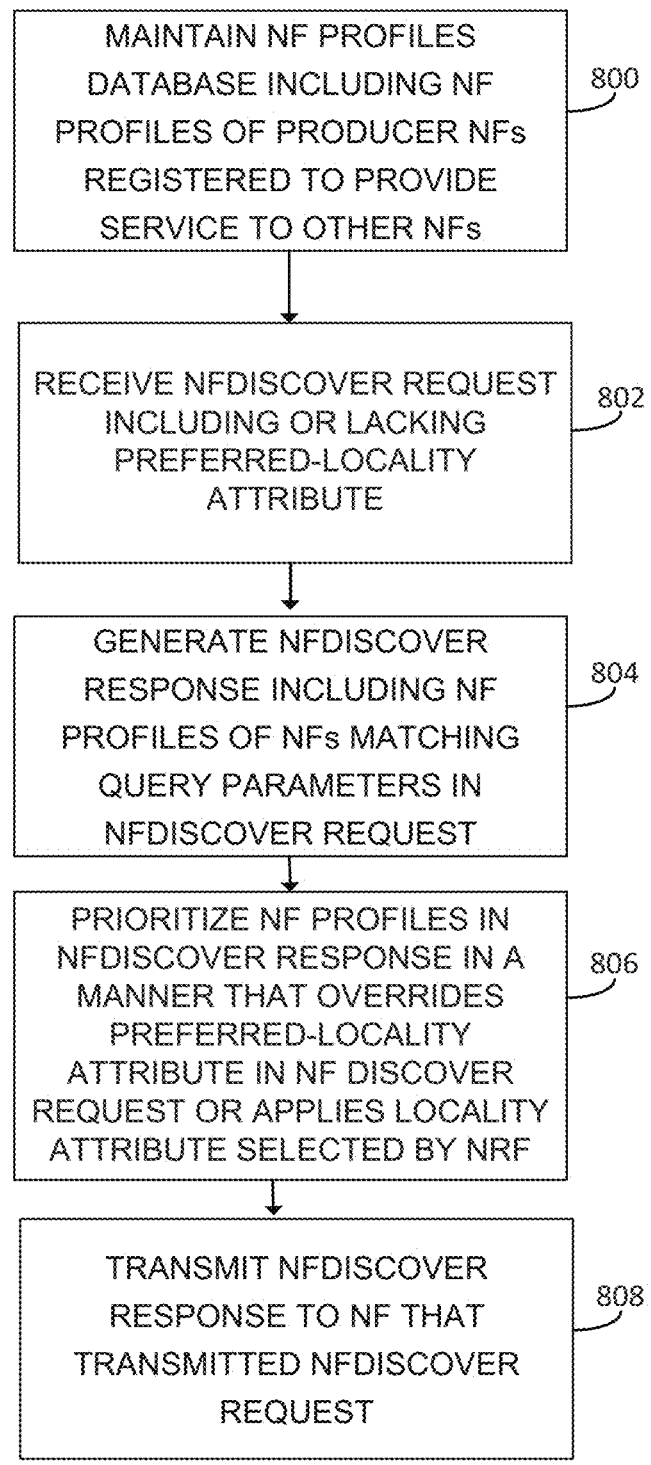
FIG. 8 is a flow chart illustrating an exemplary process implemented by an NRF applying or overriding preferred locality criteria in processing NF discovery requests.

FIG. 8 is a flow chart illustrating an exemplary process for applying or overriding a preferred locality during NF discovery. Referring to FIG. 8, in step 800, the process includes maintaining an NF profiles database including NF profiles of producer NFs registered to provide service to other NFs. For example, NRF 100 may maintain NF profiles database 704 that stores NF profiles of NFs registered with the NRF. The NF profiles may include the parameters or attributes described in 3GPP TS 29.510, including the locality attribute.

In step 802, the process includes receiving, from an NF, an NFDiscover request including a preferred-locality attribute or lacking a preferred-locality attribute. As stated above, the NFDiscover request may originate from a consumer NF, an SCP, or another NRF.

In step 804, the process includes accessing the NF profiles database to identify NF profiles of producer NFs capable of providing a service indicated by query parameters in the NFDiscover request. For example, NRF 100 may perform a lookup in NF profiles database 704 using query parameters from the NFDiscover request. The query parameters specified in the NFDiscover request may include any of the query parameters specified in Table 6.1.3.2.3.1-1 of 3GPP TS 29.510. Examples of query parameters that may be used include NFType, e.g., UDM, PCF, etc., which identifies the type of NF for providing the service needed by the consumer NF.

In step 806, the process includes generating an NFDiscover response including the NF profiles identified as capable of providing the service indicated by query parameters in the NFDiscover request. For example, NRF 100 may generate an NFDiscover response and include, in the NFDiscover response, the NF profiles located in step 804.

In step 808, the process includes prioritizing the NF profiles in the NFDiscover response in a manner that over-rides the preferred-locality attribute in the NFDiscover request or applies a locality attribute selected by the NRF. For example, NRF 100 may apply its own locality, the nearest locality to the NRF, or the nearest locality to the NRF having a heart-beating producer NF that is capable of providing the service identified in the NFDiscover request in setting priorities of NF profiles in the list to return to the requesting NF. The priorities may be set in a manner that prefers producer NFs that are closer to the locality used by the NRF to process the NFDiscover request over producer NFs that are farther away from the locality used by the NRF to process the NFDiscover request.

In step 810, the process includes transmitting the NFDiscover response to the NF that transmitted the NFDiscover request. For example, NRF 100 may transmit the NFDiscover response including the NRF-selected-locality-prioritized list or array of NF profile objects to the requesting NF.

Advantages of the subject matter described herein include enhanced NF discovery for both inter-PLMN and intra-PLMN discovery requests. Because the list of NF profiles returned to the requesting consumer NF are prioritized according to an NRF-selected locality, the consumer NF is more likely to select a producer NF to provide service that is closer to the consumer NF, resulting in more efficient service messaging in the network.

The disclosure of each of the following references is hereby incorporated herein by reference in its entirety.

REFERENCES 1. 3rd Generation Partnership Project; Technical Specification Group Services and System Aspects; System architecture for the 5G System (5GS); Stage 2 (Release 17) 3GPP TS 23.501 V17.0.0 (2021 March).
2. 3rd Generation Partnership Project; Technical Specification Group Core Network and Terminals; 5G System; Network Function Repository Services; Stage 3 (Release 17) 3GPP TS 29.510 V17.1.0 (2021 March).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for applying or overriding preferred locality criteria in processing network function (NF) discovery requests, the method comprising:
   at an NF repository function (NRF) including at least one processor:
      maintaining an NF profiles database including NF profiles of producer NFs registered to provide service to other NFs;
      receiving, from an NF, an NFDiscover request including a preferred-locality attribute that has no meaning to the NRF in a network of the NRF because the preferred-locality attribute specifies a locality in a network other than the network of the NRF;
      accessing the NF profiles database to identify NF profiles of producer NFs capable of providing a service indicated by query parameters in the NFDiscover request;
      generating an NFDiscover response including the NF profiles identified as capable of providing the service indicated by the query parameters in the NFDiscover request, wherein the NF profiles includes a first NF profile of a first producer NF and having a first priority attribute value and a second NF profile of a second producer NF and having a second priority attribute value, the second priority attribute value being higher than the first priority attribute value;
      prioritizing the NF profiles in the NFDiscover response in a manner that overrides the preferred-locality attribute in the NFDiscover request, wherein prioritizing the NF profiles in the NFDiscover response in a manner that over-rides preferred-locality attribute includes changing at least one of the priority attribute values of the first and second NF profiles so that the second priority attribute value is lower than the first priority attribute value because the second producer NF is closer than the first producer NF to a locality indicated by a preferred-locality attribute selected by the NRF to override the NF profile in the NFDiscover request; and
      transmitting the NFDiscover response to the NF that transmitted the NFDiscover request.

2. The method of claim 1 wherein receiving the NFDiscover request includes receiving the NFDiscover request including a preferred-locality attribute set by the NF and wherein prioritizing the NF profiles includes overriding the preferred-locality attribute selected by the NF with the preferred-locality attribute selected by the NRF.

3. The method of claim 2 wherein overriding the preferred-locality attribute set by the NF with the preferred-locality attribute selected by the NRF includes overriding the preferred-locality attribute selected by the NF with a preferred-locality attribute selected by the NRF that indicates a locality of the NRF or a nearest locality to the locality of the NRF.

4. The method of claim 2 wherein overriding the preferred-locality attribute set by the NF with the preferred-locality attribute selected by the NRF includes overriding the preferred-locality attribute selected by the NF with a preferred-locality attribute selected by the NRF that is configured by a network operator.

5. The method of claim 2 wherein overriding the preferred-locality attribute set by the NF with the preferred-locality attribute selected by the NRF includes overriding the preferred-locality attribute selected by the NF with a preferred-locality attribute selected by the NRF that indicates a nearest locality to a locality of the NRF with at least one heart-beating producer NF capable of providing the service indicated by the query parameters in the NFDiscover request.

6. The method of claim 1 wherein receiving the NFDiscover request includes receiving an inter-public land mobile network (PLMN) NFDiscover request or an intra-PLMN NFDiscover request.

7. A system for applying or overriding preferred locality criteria in processing network function (NF) discovery requests, the system comprising:
- an NF repository function (NRF) including at least one processor and a memory;
- an NF profiles database stored in the memory and including NF profiles of producer NFs registered to provide service to other NFs; and
- an NF profiles manager implemented by the at least one processor for receiving, from an NF, an NFDiscover request including a preferred-locality attribute that has no meaning to the NRF in a network of the NRF because the preferred-locality attribute specifies a locality in a network other than the network of the NRF, accessing the NF profiles database to identify NF profiles of producer NFs capable of providing a service indicated by query parameters in the NFDiscover request, generating an NFDiscover response including the NF profiles identified as capable of providing the service indicated by the query parameters in the NFDiscover request, prioritizing the NF profiles in the NFDiscover response in a manner that overrides the preferred-locality attribute in the NFDiscover request, and transmitting the NFDiscover response to the NE that transmitted the NFDiscover request,
- wherein the NF profiles includes a first NF profile of a first producer NF and having a first priority attribute value and a second NF profile of a second producer NF and having a second priority attribute value, the second priority attribute value being higher than the first priority attribute value; and
- wherein prioritizing the NF profiles in the NFDiscover response in a manner that over-rides preferred-locality attribute includes changing at least one of the priority attribute values of the first and second NF profiles so that the second priority attribute value is lower than the first priority attribute value because the second producer NF is closer than the first producer NF to a locality indicated by a preferred-locality attribute selected by the NRF to override the NF profile in the NFDiscover request.

8. The system of claim 7 wherein the NFDiscover request includes a preferred-locality attribute set by the NF and wherein, in prioritizing the NF profiles, the NF profiles manager is configured to override the preferred-locality attribute selected by the NF with the preferred-locality attribute selected by the NRF.

9. The system of claim 8 wherein the preferred-locality attribute selected by the NRF indicates a locality of the NRF or a nearest locality to the locality of the NRF.

10. The system of claim 8 wherein the preferred-locality attribute selected by the NRF comprises a network-operator-configured preferred locality attribute.

11. The system of claim 8 wherein the preferred-locality attribute selected by the NRF indicates a nearest locality to a locality of the NRF with at least one heart-beating producer NF capable of providing the service indicated by the query parameters in the NFDiscover request.

12. A non-transitory computer readable medium having stored thereon executable instructions that when executed by a processor of a computer control the computer to perform steps comprising:
- at a network function (NF) repository function (NRF);
  - maintaining an NF profiles database including NF profiles of producer NFs registered to provide service to other NFs;
  - receiving, from an NF, an NFDiscover request including a preferred-locality attribute that has no meaning to the NRF in a network of the NRF because the preferred-locality attribute specifies a locality in a network other than the network of the NRF;
  - accessing the NF profiles database to identify NF profiles of producer NFs capable of providing a service indicated by query parameters in the NFDiscover request;
  - generating an NFDiscover response including the NF profiles identified as capable of providing the service indicated by the query parameters in the NFDiscover request, wherein the NF profiles includes a first NF profile of a first producer NF and having a first priority attribute value and a second NF profile of a second producer NF and having a second priority attribute value, the second priority attribute value being higher than the first priority attribute value;
  - prioritizing the NF profiles in the NFDiscover response in a manner that overrides the preferred-locality attribute in the NFDiscover request, wherein prioritizing the NF profiles in the NFDiscover response in a manner that over-rides preferred-locality attribute includes changing at least one of the priority attribute values of the first and second NF profiles so that the second priority attribute value is lower than the first priority attribute value because the second producer NF is closer than the first producer NF to a locality indicated by a preferred-locality attribute selected by the NRF to override the NF profile in the NFDiscover request; and
  - transmitting the NFDiscover response to the NF that transmitted the NFDiscover request.

* * * * *

UNITED STATES PATENT AND TRADEMARK OFFICE
CERTIFICATE OF CORRECTION

| | | |
|---|---|---|
| PATENT NO. | : 11,888,946 B2 | |
| APPLICATION NO. | : 17/337356 | |
| DATED | : January 30, 2024 | |
| INVENTOR(S) | : Goel | |

It is certified that error appears in the above-identified patent and that said Letters Patent is hereby corrected as shown below:

On the Title Page

On page 4 Column 1, under item (56) Other Publications, Line 29, after "2022)." insert -- 1322/623 PCT/IN --, therefor.

In the Specification

In Column 6, Line 19, delete "(loT)" and insert -- (IoT) --, therefor.

In the Claims

In Column 15, Line 39, in Claim 7, delete "NE" and insert -- NF --, therefor.

In Column 16, Line 20, in Claim 12, delete "(NRF);" and insert -- (NRF): --, therefor.

Signed and Sealed this
Fourteenth Day of May, 2024

Katherine Kelly Vidal
*Director of the United States Patent and Trademark Office*